United States Patent
Ha et al.

(10) Patent No.: US 10,927,252 B2
(45) Date of Patent: Feb. 23, 2021

(54) THERMOPLASTIC RESIN COMPOSITION, AND MOLDED PRODUCT PRODUCED THEREFROM

(71) Applicant: LOTTE ADVANCED MATERIALS CO., LTD., Yeosu-si (KR)

(72) Inventors: Dong In Ha, Uiwang-si (KR); Tae Gon Kang, Uiwang-si (KR); Su Yeon Lee, Uiwang-si (KR); Da Heen Jeong, Uiwang-si (KR); Ki Hong Choi, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 140 days.

(21) Appl. No.: 16/340,245

(22) PCT Filed: May 30, 2017

(86) PCT No.: PCT/KR2017/005628
§ 371 (c)(1),
(2) Date: Apr. 8, 2019

(87) PCT Pub. No.: WO2018/070631
PCT Pub. Date: Apr. 19, 2018

(65) Prior Publication Data
US 2020/0040181 A1    Feb. 6, 2020

(30) Foreign Application Priority Data

Oct. 14, 2016 (KR) .................. 10-2016-0133836

(51) Int. Cl.
*C08L 69/00* (2006.01)
*C08K 3/34* (2006.01)
(Continued)

(52) U.S. Cl.
CPC ............ *C08L 69/00* (2013.01); *C08K 3/34* (2013.01); *C08K 5/49* (2013.01);
(Continued)

(58) Field of Classification Search
CPC ..... C08L 69/00; C08K 2003/265; C08K 3/34; C08K 5/49
See application file for complete search history.

(56) References Cited

U.S. PATENT DOCUMENTS 6,448,316 B1   9/2002 Hirano et al.
8,552,096 B2   10/2013 Li et al.
(Continued)

FOREIGN PATENT DOCUMENTS

JP    2015-028135 A    2/2015
KR    10-2014-0127673 A    11/2014
(Continued)

OTHER PUBLICATIONS

International Search Report in counterpart International Application No. PCT/KR2017/005628 dated Sep. 7, 2017, pp. 1-4.
(Continued)

*Primary Examiner* — John E Uselding
(74) *Attorney, Agent, or Firm* — Additon, Higgins & Pendletonn, P.A.

(57) ABSTRACT

This thermoplastic resin composition of the present invention comprises: approximately 100 parts by weight of a polycarbonate resin; approximately 1 to approximately 20 parts by weight of a rubber-modified vinyl-based copolymer resin; approximately 10 to approximately 30 parts by weight of a phosphorous-based flame retardant agent; approximately 3 to approximately 12 parts by weight of calcium carbonate; approximately 10 to approximately 40 parts by weight of talc; approximately 5 to approximately 11 parts by weight of wollastonite; and approximately 0.01 to approxi-
(Continued)

mately 5 parts by weight of a black pigment. The weight ratio of the calcium carbonate to the talc is approximately 1:1.5 to approximately 1:3.5, and the weight ratio of the talc to the wollastonite is approximately 1:0.3 to approximately 1:0.7. The thermoplastic resin composition can exhibit the properties of high gloss and a good outer appearance, and has excellent fluidity, impact resistance, heat resistance, thin film flame retardancy, and dimensional stability.

11 Claims, 1 Drawing Sheet

(51) Int. Cl.
  *C08K 5/49* (2006.01)
  *C08K 3/26* (2006.01)
(52) U.S. Cl.
  CPC .... *C08K 2003/265* (2013.01); *C08L 2201/02* (2013.01); *C08L 2201/08* (2013.01)

(56) References Cited

U.S. PATENT DOCUMENTS

| | | | |
|---|---|---|---|
| 2004/0063824 A1* | 4/2004 | Takagi | C08L 71/12 524/115 |
| 2011/0028615 A1 | 2/2011 | Li et al. | |
| 2011/0065835 A1 | 3/2011 | Hayata et al. | |
| 2014/0323625 A1 | 10/2014 | Kim et al. | |
| 2015/0247038 A1 | 9/2015 | Kim et al. | |
| 2017/0190908 A1* | 7/2017 | Choi | C08L 51/06 |
| 2017/0342262 A1* | 11/2017 | Choi | C08L 55/02 |

FOREIGN PATENT DOCUMENTS

| | | |
|---|---|---|
| KR | 10-2016-0075762 A | 6/2016 |
| WO | 2018/070631 A1 | 4/2018 |

OTHER PUBLICATIONS

Supplementary European Search Report in counterpart European Application No. 17859828.0 dated Mar. 31, 2020, pp. 1-6.

\* cited by examiner

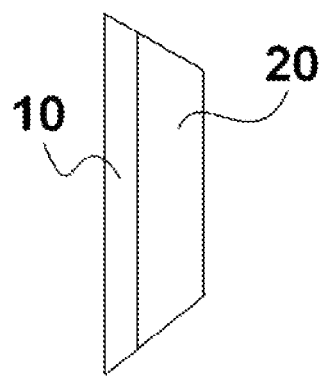

THERMOPLASTIC RESIN COMPOSITION, AND MOLDED PRODUCT PRODUCED THEREFROM

CROSS-REFERENCE TO RELATED APPLICATIONS

This application claims priority to and the benefit of International Application No. PCT/KR2017/005628, filed May 30, 2017, which published as WO2018/070631 on Apr. 19, 2018, and Korean Patent Application No. 10-2016-0133836, filed in the Korean Intellectual Property Office on Oct. 14, 2016, the entire disclosure of each of which is incorporated herein by reference.

TECHNICAL FIELD

The present invention relates to a thermoplastic resin composition and a molded product formed therefrom. More particularly, the present invention relates to a thermoplastic resin composition, which can realize high gloss and good external appearance characteristics while securing good properties in terms of flowability, impact resistance, thermal resistance, thin film flame retardancy, dimensional stability, and the like, and a molded product formed therefrom.

BACKGROUND ART

Thermoplastic resins exhibit excellent properties, such as low specific gravity, good moldability, and good impact resistance, as compared with glass or metal, and are useful for housings of electrical/electronic products, automotive interior/exterior materials, and exterior materials for buildings. Particularly, with the trend toward larger and lighter electrical/electronic products, plastic products produced from thermoplastic resins are rapidly replacing typical glass and metal-based products in the related art.

Particularly, a PC/ABS-based thermoplastic resin composition prepared by blending a polycarbonate (PC) resin with a rubber-modified aromatic vinyl copolymer resin, such as an acrylonitrile-butadiene-styrene (ABS) copolymer resin, can improve processability and chemical resistance without deterioration in impact resistance and thermal resistance of the polycarbonate resin, and can achieve cost reduction, thereby enabling various applications thereof.

In addition, such a thermoplastic resin composition may include a flame retardant and inorganic fillers, such as glass fibers, talc, wollastonite, and the like in order to improve rigidity, flame retardancy, and the like.

However, the thermoplastic resin composition including the inorganic fillers such as glass fibers can suffer from deterioration in flowability, elongation, and the like, and has difficulty realizing a good external appearance due to protrusion of the glass fibers.

Therefore, there is a need for a thermoplastic resin composition that can realize high gloss and good external appearance characteristics while securing good properties in terms of flowability, impact resistance, thermal resistance, thin film flame retardancy, dimensional stability, and the like.

One example of the background technique is disclosed in JP Unexamined Patent Publication No. 2015-028135 A.

DISCLOSURE

Technical Problem

It is one object of the present invention to provide a thermoplastic resin composition that can realize high gloss and good external appearance characteristics while securing good properties in terms of flowability, impact resistance, thermal resistance, thin film flame retardancy, dimensional stability, and the like.

It is another object of the present invention to provide a molded product formed of the thermoplastic resin composition.

The above and other objects of the present invention can be achieved by the present invention described below.

Technical Solution

One aspect of the present invention relates to thermoplastic resin composition. The thermoplastic resin composition includes: about 100 parts by weight of a polycarbonate resin; about 1 to about 20 parts by weight of a rubber-modified vinyl copolymer resin; about 10 to about 30 parts by weight of a phosphorus flame retardant; about 3 to about 12 parts by weight of calcium carbonate; about 10 to about 40 parts by weight of talc; about 5 to about 11 parts by weight of wollastonite; and about 0.01 to about 5 parts by weight of a black pigment, wherein a weight ratio of calcium carbonate to talc ranges from about 1:1.5 to about 1:3.5 and a weight ratio of talc to wollastonite ranges from about 1:0.3 to about 1:0.7.

In one embodiment, the rubber-modified vinyl copolymer resin may include about 60 wt % or more of a rubber-modified aromatic vinyl graft copolymer obtained through graft copolymerization of an aromatic vinyl monomer and an alkyl (meth)acrylate monomer to a rubber polymer and about 40 wt % or less of an aromatic vinyl copolymer resin.

[13] In one embodiment, the aromatic vinyl copolymer resin may be a polymer of a monomer mixture comprising an aromatic vinyl monomer and a vinyl cyanide monomer.

In one embodiment, the phosphorus flame retardant may include at least one of a phosphate compound, a phosphonate compound, a phosphinate compound, a phosphine oxide compound, and a phosphazene compound.

In one embodiment, the rubber-modified vinyl copolymer resin may be present in a smaller amount than the phosphorus flame retardant.

In one embodiment, the thermoplastic resin composition may have a melt flow index (MI) of about 32 g/10 min to about 45 g/10 min, as measured at 220° C. under a load of 5 kgf in accordance with ASTM D1238, and a notched Izod impact strength of about 5 kgf·cm/cm or more, as measured on a ⅛" thick specimen in accordance with ASTM D256.

In one embodiment, the thermoplastic resin composition may have a glass transition temperature of about 82° C. to about 90° C. and a flame retardancy of V1 or higher, as measured on a 1.0 mm thick specimen in accordance with the UL94 standard.

In one embodiment, the thermoplastic resin composition may have a coefficient of linear expansion of about 20 cm/cm° C. to about 45 cm/cm° C., as measured on a 6.4 mm thick flexural specimen at 90° C. in accordance with ASTM D696.

In one embodiment, the thermoplastic resin composition may have a gloss (60°) of about 95% to about 100%, as measured on an injection molded specimen at an angle of 60° in accordance with ASTM D523, and a luminance (L*) of about 90 to about 100, a* of about −0.1 to about 0.3 and b* of about −0.1 to about 0.3, as measured on a 3.2 mm thick specimen in accordance with ASTM D2244.

Another aspect of the present invention relates to a molded product. The molded product is formed of the thermoplastic resin composition as set forth above.

In one embodiment, the molded product may be a plastic member of a housing of an electronic product that includes a metal frame and the plastic member adjoining at least one surface of the metal frame.

Advantageous Effects

The present invention provides a thermoplastic resin composition that can realize high gloss and good external appearance characteristics while securing good properties in terms of flowability, impact resistance, thermal resistance, thin film flame retardancy, dimensional stability, and the like, and a molded product formed therefrom.

DESCRIPTION OF DRAWINGS

FIG. 1 is a schematic sectional view of a housing of an electronic product according to one embodiment of the present invention.

BEST MODE

Hereinafter, embodiments of the present invention will be described in detail.

A thermoplastic resin composition according to the present invention includes: (A) a polycarbonate resin; (B) a rubber-modified vinyl copolymer resin; (C) a phosphorus flame retardant; (D) calcium carbonate; (E) talc; (F) wollastonite; and (G) a black pigment.

(A) Polycarbonate Resin

The polycarbonate (PC) resin according to one embodiment of the invention may include any typical polycarbonate (PC) resin used in thermoplastic resin compositions. For example, the polycarbonate resin may be an aromatic polycarbonate resin prepared by reacting diphenols (aromatic diol compounds) with a precursor, such as phosgene, halogen formate, or carbonate diester.

Examples of the diphenols may include 4,4'-biphenol, 2,2-bis(4-hydroxyphenyl)-propane, 2,4-bis(4-hydroxyphenyl)-2-methylbutane, 1,1-bis(4-hydroxyphenyl)cyclohexane, 2,2-bis(3-chloro-4-hydroxyphenyl)propane, and 2,2-bis-(3,5-dichloro-4-hydroxyphenyl)propane, without being limited thereto. For example, the diphenols may be 2,2-bis-(4-hydroxyphenyl)propane, 2,2-bis(3,5-dichloro-4-hydroxyphenyl)propane, or 1,1-bis(4-hydroxyphenyl)cyclohexane, specifically 2,2-bis-(4-hydroxyphenyl)propane, which is also referred to as bisphenol A.

In some embodiments, the polycarbonate resin may be a branched polycarbonate resin. For example, the polycarbonate resin may be a polycarbonate resin prepared by adding a tri- or higher polyfunctional compound, specifically, a tri- or higher valent phenol group-containing compound, in an amount of about 0.05 mol % to about 2 mol % based on the total number of moles of the diphenols used in polymerization.

In some embodiments, the polycarbonate (PC) resin may be a homopolycarbonate resin, a copolycarbonate resin, or a blend thereof. In addition, the polycarbonate (PC) resin may be partly or completely replaced by an aromatic polyester-carbonate resin obtained by polymerization in the presence of an ester precursor, for example, a bifunctional carboxylic acid.

In some embodiments, the polycarbonate resin may have a weight average molecular weight (Mw) of about 10,000 g/mol to about 50,000 g/mol, for example, about 15,000 g/mol to about 40,000 g/mol. Within this range, the thermoplastic resin composition can have good flowability (processability).

In some embodiments, the polycarbonate resin may have a melt-flow index (MI) of about 10 g/10 min to about 80 g/10 min, as measured at 300° C. under a load of 1.2 kgf in accordance with ISO 1133, without being limited thereto. Alternatively, the polycarbonate resin may be a mixture of at least two polycarbonate resins having different melt flow indexes.

(B) Rubber-Modified Vinyl Copolymer Resin

The rubber-modified vinyl copolymer resin may be a rubber-modified aromatic vinyl graft copolymer (B1) prepared by grafting an alkyl (meth)acrylate monomer and an aromatic vinyl monomer to a rubber polymer, or a mixture of the rubber-modified aromatic vinyl graft copolymer (B1) and an aromatic vinyl copolymer resin (B2).

Unless otherwise defined herein, the term "(meth)acryl" refers to "acryl" and/or "methacryl". For example, "(meth)acrylate" may include "acrylate" and/or "methacrylate".

(B1) Rubber-Modified Aromatic Vinyl Graft Copolymer

The rubber-modified aromatic vinyl graft copolymer according to one embodiment of the invention may be obtained by adding an aromatic vinyl monomer, an alkyl (meth)acrylate monomer, and the like to a rubber polymer, and further adding a monomer for imparting processability and thermal resistance, as needed, followed by polymerization (graft copolymerization). Here, polymerization may be carried out by any known polymerization method, such as emulsion polymerization, suspension polymerization, bulk polymerization, and the like.

Examples of the rubber polymer may include: diene rubbers, such as polybutadiene, poly(styrene-butadiene), and poly(acrylonitrile-butadiene); saturated rubbers obtained by adding hydrogen to the diene rubbers; isoprene rubbers; acrylic rubbers, such as poly(butyl acrylic acid); and an ethylene-propylene-diene monomer terpolymer (EPDM). These may be used alone or as a mixture thereof. For example, the rubber polymer may be a diene rubber, specifically butadiene rubber, butyl acrylate rubber. The rubber polymer may be present in an amount of about 20 wt % to about 70 wt %, for example, about 30 wt % to about 65 wt %, based on the total weight (100 wt %) of the rubber-modified aromatic vinyl graft copolymer. Within this range, the thermoplastic resin composition can have good properties in terms of impact resistance and mechanical properties. In addition, the rubber polymer (rubber particles) may have an average particle size (Z-average) of about 0.05 μm to about 6 μm, for example, about 0.15 μm to about 4 μm, specifically about 0.25 μm to about 3.5 μm. Within this range, the thermoplastic resin composition can have good properties in terms of impact resistance, external appearance, and flame retardancy.

The aromatic vinyl monomer is graft-polymerizable with the rubber polymer and may include, for example, styrene, α-methylstyrene, β-methylstyrene, p-methyl styrene, p-t-butyl styrene, ethyl styrene, vinylxylene, monochlorostyrene, dichlorostyrene, dibromostyrene, and vinyl naphthalene, without being limited thereto. These may be used alone or as a mixture thereof. The aromatic vinyl monomer may be present in an amount of about 5 wt % to about 40 wt %, for example, about 10 wt % to about 30 wt %, based on the total weight (100 wt %) of the rubber-modified aromatic vinyl graft copolymer. Within this range, the thermoplastic resin composition can exhibit good properties in terms of fatigue resistance, impact resistance, mechanical properties, and the like.

In some embodiments, the alkyl (meth)acrylate monomer may include at least one selected from among methyl (meth)acrylate, ethyl (meth)acrylate, propyl (meth)acrylate, and a mixture thereof. For example, the alkyl (meth)acrylate monomer may be methyl (meth)acrylate, specifically methyl methacrylate. The alkyl (meth)acrylate monomer may be present in an amount of about 1 wt % to about 35 wt %, for example, about 5 wt % to about 30 wt %, based on the total weight (100 wt %) of the rubber-modified aromatic vinyl graft copolymer. Within this range, the thermoplastic resin composition can exhibit good properties in terms of impact resistance, mechanical properties, and the like.

Examples of the monomer for imparting processability and thermal resistance may include vinyl cyanide compounds, such as acrylonitrile, methacrylonitrile, ethacrylonitrile, phenyl acrylonitrile, α-chloroacrylonitrile, fumaronitrile, and the like, acrylic acid, maleic anhydride, and N-substituted maleimide, without being limited thereto. These may be used alone or as a mixture thereof. The monomer for imparting processability and thermal resistance may be present in an amount of about 15 wt % or less, for example, about 0.1 wt % to about 10 wt %, based on the total weight of the rubber-modified aromatic vinyl graft copolymer. Within this range, the thermoplastic resin composition can exhibit good properties in terms of processability, thermal resistance, mechanical properties, and the like.

In some embodiments, the rubber-modified aromatic vinyl graft copolymer may be present in an amount of about 60 wt % or more, for example, about 80 wt % to about 100 wt %, based on 100 wt % of the rubber-modified vinyl copolymer resin 100 wt %. Within this range, the thermoplastic resin composition can exhibit good properties in terms of impact resistance, mechanical properties, flowability, and the like.

(B2) Aromatic Vinyl Copolymer Resin

The aromatic vinyl copolymer resin according to one embodiment of the invention may be an aromatic vinyl copolymer resin used in a typical rubber-modified vinyl copolymer resin. For example, the aromatic vinyl copolymer resin may be a copolymer resin of a monomer mixture comprising an aromatic vinyl monomer and a monomer copolymerizable with the aromatic vinyl monomer, such as a vinyl cyanide monomer.

In some embodiments, the aromatic vinyl copolymer resin may be obtained by mixing the aromatic vinyl monomer and the monomer copolymerizable with the aromatic vinyl monomer, followed by polymerization. Here, polymerization may be carried out by any known polymerization method, such as emulsion polymerization, suspension polymerization, bulk polymerization, and the like.

Examples of the aromatic vinyl monomer may include styrene, α-methylstyrene, β-methyl styrene, p-m ethyl styrene, p-t-butyl styrene, ethyl styrene, vinylxylene, monochlorostyrene, dichlorostyrene, dibromostyrene, and vinyl naphthalene, without being limited thereto. These may be used alone or as a mixture thereof. The aromatic vinyl monomer may be present in an amount of about 20 wt % to about 90 wt %, for example, about 30 wt % to about 80 wt %, based on 100 wt % of the aromatic vinyl copolymer resin. Within this range, the thermoplastic resin composition can exhibit good properties in terms of impact resistance, flowability, and the like.

Examples of the monomer copolymerizable with the aromatic vinyl monomer may include vinyl cyanide monomers, such as acrylonitrile, methacrylonitrile, ethacrylonitrile, phenylacrylonitrile, α-chloroacrylonitrile, and fumaronitrile, without being limited thereto. These may be used alone or as a mixture thereof. The monomer copolymerizable with the aromatic vinyl monomer may be present in an amount of about 10 wt % to about 80 wt %, for example, about 20 wt % to about 70 wt %, based on 100 wt % of the aromatic vinyl copolymer resin. Within this range, the thermoplastic resin composition can exhibit good properties in terms of impact resistance, flowability, and the like.

In some embodiments, the aromatic vinyl copolymer resin may have a weight average molecular weight (Mw) of about 10,000 g/mol to about 300,000 g/mol, for example, about 15,000 g/mol to about 150,000 g/mol, as measured by gel permeation chromatography (GPC). Within this range, the thermoplastic resin composition can exhibit good properties in terms of mechanical strength, processability, and the like.

In some embodiments, the aromatic vinyl copolymer resin may be present in an amount of about 40 wt % or less, for example, about 20 wt % or less, based on 100 wt % of the rubber-modified vinyl copolymer resin. Within this range, the thermoplastic resin composition can exhibit good properties in terms of flowability, thermal stability, and the like.

The rubber-modified vinyl copolymer resin (B) according to the embodiment of the invention may be present in an amount of about 1 to about 20 parts by weight, for example, about 3 to about 10 parts by weight, relative to about 100 parts by weight of the polycarbonate resin (A). If the amount of the rubber-modified vinyl copolymer resin (B) is less than about 1 part by weight relative to about 100 parts by weight of the polycarbonate resin (A), the thermoplastic resin composition can suffer from deterioration in impact resistance, mechanical properties, and the like, and if the amount of the rubber-modified vinyl copolymer resin (B) exceeds about 20 parts by weight, the thermoplastic resin composition can suffer from deterioration in flowability, flame retardancy, and the like.

(C) Phosphorus Flame Retardant

The phosphorus flame retardant according to one embodiment of the invention may include any typical phosphorus flame retardant used in typical flame retardant thermoplastic resin compositions. For example, the phosphorus flame retardant may include a phosphate compound, a phosphonate compound, a phosphinate compound, a phosphine oxide compound, a phosphazene compound, and a metal salt thereof. These compounds may be used alone or as a mixture thereof.

In some embodiments, the phosphorus flame retardant may include an aromatic phosphoric ester compound represented by Formula 1.

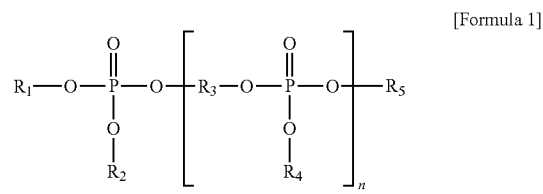

[Formula 1]

wherein $R_1$, $R_2$, $R_4$ and $R_5$ are each independently a hydrogen atom, a $C_6$ to $C_{20}$ aryl group, or a $C_1$ to $C_{10}$ alkyl group-substituted $C_6$ to $C_{20}$ aryl group; $R_3$ is a $C_6$ to $C_{20}$ arylene group or a $C_1$ to $C_{10}$ alkyl group-substituted $C_6$ to $C_{20}$ arylene group, for example, derivatives of a dialcohol, such as resorcinol, hydroquinone, bisphenol-A, or bisphenol-S; and n is an integer from 0 to 10, for example, 0 to 4.

When n is 0 in Formula 1, examples of the aromatic phosphoric ester compound may include diaryl phosphate such as diphenyl phosphate, triphenyl phosphate, tricresyl phosphate, trixylenyl phosphate, tri(2,6-dimethylphenyl) phosphate, tri(2,4,6-trimethylphenyl) phosphate, tri(2,4-di-tert-butylphenyl) phosphate, and tri(2,6-dimethylphenyl) phosphate. In addition, when n is 1 in Formula 1, examples of the aromatic phosphoric ester compound may include bisphenol-A bis(diphenyl phosphate), resorcinol bis(diphenyl phosphate), resorcinol bis[bis(2,6-dimethylphenyl) phosphate], resorcinol bis[bis(2,4-di-tert-butylphenyl) phosphate], hydroquinone bis[bis(2,6-dimethylphenyl) phosphate], and hydroquinone bis[bis(2,4-di-tert-butylphenyl) phosphate], without being limited thereto. These compounds may be used alone or as a mixture thereof.

In some embodiments, the phosphorus flame retardant (C) may be present in an amount of about 10 to about 30 parts by weight, for example, about 15 to about 25 parts by weight, relative to about 100 parts by weight of the polycarbonate resin (A). If the amount of the phosphorus flame retardant (C) is less than about 10 parts by weight relative to about 100 parts by weight of the polycarbonate resin (A), the thermoplastic resin composition can suffer from deterioration in (thin film) flame retardancy, and if the amount of the phosphorus flame retardant (C) exceeds about 30 parts by weight, the thermoplastic resin composition can suffer from deterioration in impact resistance, thermal stability, and the like.

In some embodiments, the rubber-modified vinyl copolymer resin (B) may be added in a smaller amount than the phosphorus flame retardant (C).

(D) Calcium Carbonate

According to the present invention, calcium carbonate serves to improve flowability, rigidity, (thin film) flame retardancy and dimensional stability of the thermoplastic resin composition while maintaining balance therebetween in cooperation with talc and wollastonite.

In some embodiments, the calcium carbonate may be amorphous or crystalline calcium carbonate. Advantageously, the amorphous calcium carbonate has a larger specific surface area and a finer particle size than the crystalline calcium carbonate.

In some embodiments, the calcium carbonate may be natural calcium carbonate or synthetic calcium carbonate. The synthetic calcium carbonate may be prepared by any process known in the related art, such as a carbonation reaction process, an aqueous solution process, and the like. Specifically, in the aqueous solution process, an aqueous solution, in which calcium salts are dissolved, is mixed with an aqueous solution, in which salts containing a carboxyl group are dissolved, to produce synthetic calcium carbonate through precipitation of the mixture.

In some embodiments, the calcium carbonate may have an aragonite, vaterite or calcite structure, and may have a pyramidal or cubic particle shape. The calcium carbonate may have an average particle diameter of about 0.03 to about 30 μm, without being limited thereto. Here, the average particle diameter was measured using a particle size distributor.

In some embodiments, the calcium carbonate (D) may be present in an amount of about 3 to about 12 parts by weight, for example, about 5 to about 10 parts by weight, relative to about 100 parts by weight of the polycarbonate resin (A). If the amount of the calcium carbonate (D) is less than about 3 parts by weight relative to about 100 parts by weight of the polycarbonate resin (A), the thermoplastic resin composition can suffer from deterioration in gloss, rigidity, dimensional stability, and the like, and if the amount of the calcium carbonate (D) exceeds about 12 parts by weight, the thermoplastic resin composition can suffer from deterioration in impact resistance, flame retardancy, mechanical properties, and the like.

(E) Talc

According to the present invention, talc serves to improve flowability, rigidity, (thin film) flame retardancy, dimensional stability, gloss and external appearance of the thermoplastic resin composition while maintaining balance therebetween in cooperation with calcium carbonate and wollastonite.

In some embodiments, the talc may be typical flake talc. The talc may have an average particle diameter of about 2 μm to about 10 μm, for example, about 3 μm to about 7 μm. Within this range, the thermoplastic resin composition can exhibit good properties in terms of rigidity, dimensional stability, gloss (external appearance), and the like.

In some embodiments, the talc may have a bulk density of about 0.3 $g/cm^3$ to about 1.0 $g/cm^3$, for example, about 0.4 $g/cm^3$ to about 0.8 $g/cm^3$. Within this range, the thermoplastic resin composition can exhibit good properties in terms of rigidity, dimensional stability, gloss (external appearance), and the like.

In some embodiments, the talc (E) may be present in an amount of about 10 to about 40 parts by weight, for example, about 15 to about 30 parts by weight, relative to about 100 parts by weight of the polycarbonate resin (A). If the amount of the talc (E) is less than about 10 parts by weight relative to about 100 parts by weight of the polycarbonate resin (A), the thermoplastic resin composition can suffer from deterioration in flowability, dimensional stability, rigidity, and the like, and if the amount of the talc exceeds about 40 parts by weight, the thermoplastic resin composition can suffer from deterioration in impact resistance, mechanical properties, flame retardancy, and the like.

In some embodiments, the weight ratio of the calcium carbonate (D) to the talc (E) ((D):(E)) may range from about 1:1.5 to about 1:3.5, for example, about 1:2 to about 1:3. If the weight ratio of the calcium carbonate (D) to the talc (E) ((D):(E)) is less than about 1:1.5, the thermoplastic resin composition can suffer from deterioration in dimensional stability, gloss (external appearance), rigidity, and the like, and if the weight ratio of the calcium carbonate (D) to the talc (E) ((D):(E)) exceeds about 1:3.5, the thermoplastic resin composition can suffer from deterioration in gloss (external appearance), impact resistance, flowability, flame retardancy, and the like.

(F) Wollastonite

According to the present invention, wollastonite serves to improve dimensional stability, flowability, rigidity, (thin film) flame retardancy, gloss and external appearance of the thermoplastic resin composition while maintaining balance therebetween in cooperation with calcium carbonate and talc.

In some embodiments, the wollastonite refers to a white acicular calcium-based mineral and at least part of the surface thereof may be subjected to hydrophobic surface treatment. Here, hydrophobic surface treatment may be performed by, for example, coating the surface of the wollastonite with an olefin, epoxy or silane-based substance, without being limited thereto.

In some embodiments, the wollastonite may have an average transverse length (diameter) of about 5 μm to about 10 μm, for example, about 6 μm to about 9 μm, and an aspect ratio (width:length) of about 1:7 to about 1:9. Within this range, the thermoplastic resin composition can exhibit good properties in terms of rigidity, dimensional stability, impact resistance, and the like.

In some embodiments, the wollastonite may have a bulk density of about 0.3 g/cm³ to about 0.6 g/cm³, for example, about 0.4 g/cm³ to about 0.5 g/cm³. Within this range, the thermoplastic resin composition can exhibit good properties in terms of rigidity, dimensional stability, and the like.

In some embodiments, the wollastonite (F) may be present in an amount of about 5 to about 11 parts by weight, for example, about 7 to about 10 parts by weight, relative to about 100 parts by weight of the polycarbonate resin (A). If the amount of the wollastonite (F) is less than about 5 parts by weight relative to about 100 parts by weight of the polycarbonate resin (A), the thermoplastic resin composition can suffer from deterioration in dimensional stability, flowability, impact resistance, (thin film) flame retardancy, and the like, and if the amount of the wollastonite (F) exceeds about 11 parts by weight, the thermoplastic resin composition can suffer from deterioration in gloss (external appearance), impact resistance, flame retardancy, and the like.

In some embodiments, the weight ratio of the talc (E) to the wollastonite (F) ((E):(F)) may range from about 1:0.3 to about 1:0.7, for example, about 1:0.35 to about 1:0.67, specifically about 1:0.5 to about 1:0.65. If the weight ratio of the talc (E) to the wollastonite (F) ((E):(F)) is less than about 1:0.3, the thermoplastic resin composition can suffer from deterioration in rigidity, dimensional stability, and the like, and if the weight ratio of the talc (E) to wollastonite (F) ((E):(F)) exceeds about 1:0.7, the thermoplastic resin composition can suffer from deterioration in impact resistance, flame retardancy, and the like.

In some embodiments, the sum of the contents of calcium carbonate, talc and wollastonite may be less than the content of the phosphorus flame retardant.

(G) Black Pigment

Even with a small amount (1 phr) of a black pigment, the thermoplastic resin composition according to the present invention can realize high gloss and pleasant external appearance in cooperation with calcium carbonate, talc, and wollastonite. For example, the black pigment may be carbon black.

In some embodiments, the black pigment (G) may be present in an amount of about 0.01 to about 5 parts by weight, for example, about 0.1 to about 2 parts by weight, relative to 100 parts by weight of the polycarbonate resin (A). If the amount of the black pigment (G) is less than about 0.01 parts by weight relative to 100 parts by weight of the polycarbonate resin (A), the thermoplastic resin composition can suffer from deterioration in gloss and color, and if the amount of the black pigment (G) exceeds about 5 parts by weight, it is difficult to realize a good external appearance and the thermoplastic resin composition can suffer from deterioration in impact resistance, mechanical properties, and the like.

The thermoplastic resin composition according to one embodiment may further include additives, such as release agents, lubricants, plasticizers, heat stabilizers, photostabilizers, flame retardant aids, anti-dripping agents, antioxidants, and mixtures thereof.

In some embodiments, the additives may be any additives used in a typical thermoplastic resin composition without limitation. For example, the additives may include release agents, such as polyethylene wax, a fluorine-containing polymer, silicone oil, a metal salt of stearic acid, a metal salt of montanic acid, and montanic ester wax; nucleating agents, such as clay; antioxidants, such as hindered phenol-based compounds; and mixtures thereof, without being limited thereto. The additives may be present in an amount of about 0.1 to about 40 parts by weight relative to about 100 parts by weight of the polycarbonate resin, without being limited thereto.

The thermoplastic resin composition according to one embodiment of the invention may be prepared in pellet form by mixing the aforementioned components, followed by melt extrusion at about 200° C. to about 280° C., for example, about 250° C. to about 260° C., using a typical twin-screw extruder.

In some embodiments, the thermoplastic resin composition may have a melt flow index (MI) of about 32 g/10 min to about 45 g/10 min, for example, about 34 g/10 min to about 42 g/10 min, as measured at 220° C. under a load of 5 kgf in accordance with ASTM D1238.

In some embodiments, the thermoplastic resin composition may have a notched Izod impact strength of about 5 kgf·cm/cm or more, for example, about 5 kgf·cm/cm to about 8 kgf·cm/cm, as measured on a ⅛" thick specimen in accordance with ASTM D256.

In some embodiments, the thermoplastic resin composition may have a glass transition temperature of about 82° C. to about 90° C., for example, about 84° C. to about 89° C.

In some embodiments, the thermoplastic resin composition may have a flame retardancy of V1 or higher, as measured on a 1.0 mm thick specimen in accordance with the UL94 standard.

In some embodiments, the thermoplastic resin composition may have a coefficient of linear expansion of about 20 cm/cm° C. to about 45 cm/cm° C., for example, about 25 cm/cm° C. to about 42 cm/cm° C., as measured on a 6.4 mm thick flexural specimen at 90° C. in accordance with ASTM D696.

In some embodiments, the thermoplastic resin composition may have a gloss (60°) of about 95% to about 100%, for example, about 96% to about 99%, as measured on an injection-molded specimen (black pigment added) at an angle of 60° in accordance with ASTM D523.

In some embodiments, the thermoplastic resin composition may have a luminance (L*) of about 90 to about 100, for example, 95 to 99, and a* and b* of each independently about −0.1 to about 0.3, for example, about 0 to about 0.2, as measured on a 3.2 mm thick specimen (black pigment added) in accordance with ASTM D2244.

A molded product according to the present invention is formed of the thermoplastic resin composition.

In some embodiments, the molded product may be a plastic member of a housing of an electronic product, which includes a metal frame and a plastic member adjoining at least one surface of the metal frame.

FIG. 1 is a schematic sectional view of a housing of an electronic product according to one embodiment of the present invention. It should be understood that the drawings are not to precise scale and the dimensions of components are exaggerated for clarity of description in the drawings. Referring to FIG. 1, the housing of an electronic product according to one embodiment includes a metal frame 10 and at least one plastic member 20 adjoining at least one surface of the metal frame 10, wherein the plastic member is formed of the thermoplastic resin composition according to the embodiments of the invention.

In some embodiments, the metal frame 10 and the plastic member 20 may have various shapes without being limited to the shapes shown in the drawings. The metal frame 10 and the plastic member 20 form an adjoining structure in which the metal frame 10 adjoins at least one surface of the plastic member 20. The adjoining structure may be realized by bonding or insertion, but is not limited thereto.

In some embodiments, the metal frame 10 may be a stainless steel frame or may be selected from among any commercially available products, which can be applied to a typical housing of electronic products.

In some embodiments, the plastic member 20 may be formed of the polycarbonate resin composition by various molding methods, such as injection molding, extrusion molding, vacuum molding, casting molding, and the like. Specifically, the plastic member 20 may be formed by heat molding, steam molding (RHCM (rapid heat cycle molding)) or the like, and may be a front cover or a rear cover of a 22" to 75" thin film type TV, a thin film monitor, and the like.

MODE FOR INVENTION

Next, the present invention will be described in more detail with reference to some examples. It should be understood that these examples are provided for illustration only and are not to be in any way construed as limiting the present invention.

EXAMPLE

Details of components used in Examples and Comparative Examples are as follows.

(A) polycarbonate Resin

A bisphenol-A type polycarbonate resin (melt-flow index: 60±10 g/10 min (measured under conditions of 300° C. and 1.2 kgf in accordance with ISO 1133)) was used.

(B) Rubber-Modified Vinyl Copolymer Resin

A rubber-modified aromatic vinyl graft copolymer (g-MBS) obtained through graft copolymerization of 25 wt % of styrene and 15 wt % of methyl methacrylate to 60 wt % of polybutadiene rubber (PBR) having an average particle size (Z-average) of 310 nm was used.

(C) Phosphorus Flame Retardant

An oligomer type bisphenol-A diphosphate (Manufacturer: Yoke Chemical Co. Ltd., Product Name: YOKE BDP) was used.

(D) Calcium Carbonate

Calcium carbonate (Manufacturer: OMYA Co. Ltd., Product Name: 2B) was used.

(E) Talc

Talc (Manufacturer: KOCH Co. Ltd., Product Name: KCM 6300, volume density: 0.4 to 0.6 g/cm3) was used.

(F) Wollastonite

Wollastonite (Manufacturer: NYCO Co. Ltd., Product Name: 4W, volume density: 0.4 to 0.5 g/cm3) was used.

(G) Black Pigment

Carbon black (Manufacturer: Orion Co. Ltd., Product Name: High Black 50 L) was used.

Examples 1 to 3 and Comparative Examples 1 to 3

The aforementioned components were mixed in amounts as listed in Table 1 and subjected to extrusion molding at 250° C., thereby preparing a thermoplastic resin composition in pellet form. Extrusion molding was performed using a twin-screw extruder (L/D: 36, Φ: 45 mm). The prepared pellets were dried at 80° C. for 4 hours or more and then subjected to injection molding using a 6 oz. injector under conditions of an injection molding temperature of 250° C. to 260° C. and a mold temperature: 60° C., thereby preparing a specimen. The prepared specimen was evaluated as to the following properties. Results are shown in Table 1.

Property Evaluation (1) Melt-flow Index (MI) (unit: g/10 min): Melt flow index was measured at 220° C. under a load of 5 kgf in accordance with ASTM D1238.

(2) Impact strength (unit: kgf·cm/cm): Notched Izod impact strength was measured on a ⅛" thick specimen in accordance with ASTM D256.

(3) Glass transition temperature (unit: ° C.): In a Q20 instrument (Differential Scanning Calorimeter (DSC), TA), 5 to 10 mg of a simple was dried at 80° C. in a vacuum (vapor fraction: 3,000 ppm or less) for 4 hours, heated from 30° C. to 400° C. at a heating rate of 20° C./min in a nitrogen atmosphere, left at 400° C. for 1 minute, cooled to 30° C. at a cooling rate of 20° C./min, and left at 30° C. for 1 minute, followed by measuring a transition temperature while heating the sample to 400° C. at a heating rate of 20° C./min ($2^{nd}$ scan) to calculate glass transition temperature based on the transition temperature.

(4) Flame retardancy: Flame retardancy was measured using 1.0 mm thick specimens in accordance with the UL 94 flammability test standard.

(5) Coefficient of linear expansion (unit: cm/cm° C.): Coefficient of linear expansion was measured on a 6.4 mm thick flexural specimen at 90° C. in accordance with ASTM D696.

(6) Luminous flat mold dimensional evaluation (unit: mm): Longitudinal length of an injection molded specimen was measured. The specimen was prepared by injection molding at a molding temperature of 260° C. and at each holding pressure (30 bar, 50 bar and 70 bar) using a luminous mold having a size of 400 mm×100 mm×10 mm (length×width×thickness) so as not to form burrs, and left at 23° C. for 24 hours.

(7) Gloss (60°) (unit: %): Gloss was measured on a specimen prepared by injection molding and having a size of 90 mm×50 mm×2 mm using a MG-268 gloss meter (Konica Minolta Co., Ltd.) in accordance with ASTM D523.

(8) Color (Luminance (L*) and chroma (a* and b*)): Luminance (L*) and chroma (a* and b*) were measured on a 3.2 mm thick injection-molded specimen using a colorimeter (CM-3600d, Konica Minolta Co. Ltd.) in specular component excluded (SCE) mode in accordance with ASTM D2244.

TABLE 1

|  | Example 1 | Example 2 | Example 3 | Comparative Example 1 | Comparative Example 2 | Comparative Example 3 |
|---|---|---|---|---|---|---|
| (A) (parts by weight) | 100 | 100 | 100 | 100 | 100 | 100 |
| (B) (parts by weight) | 10 | 10 | 10 | 10 | 10 | 10 |
| (C) (parts by weight) | 22 | 22 | 22 | 22 | 22 | 22 |
| (D) (parts by weight) | 10 | 7 | 5 | 3 | 12 | 15 |
| (E) (parts by weight) | 20 | 20 | 15 | 15 | 15 | 3 |

TABLE 1-continued

|  | Example 1 | Example 2 | Example 3 | Comparative Example 1 | Comparative Example 2 | Comparative Example 3 |
|---|---|---|---|---|---|---|
| (F) parts by weight | 7 | 9 | 10 | 12 | 3 | 12 |
| (G) parts by weight | 1 | 1 | 1 | 1 | 1 | 1 |
| (D):(E) (weight ratio) | 1:2 | 1:2.86 | 1:3 | 1:5 | 1:1.25 | 1:0.2 |
| (E):(F) (weight ratio) | 1:0.35 | 1:0.45 | 1:0.67 | 1:0.8 | 1:0.2 | 1:4 |
| Melt-flow index | 40 | 38 | 35 | 30 | 30 | 30 |
| Notched Izod impact strength | 6 | 7 | 7 | 5 | 4 | 4 |
| Glass transition temperature | 85 | 85 | 85 | 85 | 85 | 85 |
| Flame retardancy (1.0 T) | V1 | V1 | V1 | V1 | V2 | V2 |
| Coefficient of linear expansion | 41 | 35 | 30 | 30 | 55 | 50 |
| Luminous flat mold dimensional evaluation | 396 | 398 | 399 | 398 | 385 | 395 |
| Gloss | 98 | 98 | 98 | 90 | 95 | 85 |
| L* | 98 | 98 | 98 | 98 | 98 | 95 |
| a* | 0.1 | 0.1 | 0.1 | 0.1 | 0.1 | 0.1 |
| b* | 0.1 | 0.1 | 0.1 | 0.1 | 0.5 | 0.6 |

From Table 1, it can be seen that the thermoplastic resin compositions according to the present invention exhibited good properties in terms of flowability (molding processability), impact resistance, thermal resistance, thin film flame retardancy, appearance characteristics such as gloss, color, and the like, dimensional stability, and balance therebetween.

Conversely, the thermoplastic resin composition of Comparative Example 1, in which the weight ratio of calcium carbonate to talc was greater than 1:3.5 and wollastonite was present in an excessive amount, suffered from significant deterioration in gloss and relative deterioration in flowability and impact resistance. The thermoplastic resin composition of Comparative Example 2, in which the weight ratio of calcium carbonate to talc was less than 1:1.5 and wollastonite was present in a small amount, suffered from significant deterioration in dimensional stability and also suffered from deterioration in flowability, impact resistance, flame retardancy, appearance, and the like. The thermoplastic resin composition of Comparative Example 3, in which the weight ratio of calcium carbonate to talc was less than 1:1.5, talc was present in a small amount, and wollastonite was present in an excessive amount, generally suffered from deterioration in gloss, flowability, impact resistance, dimensional stability, flame retardancy, and the like.

It should be understood that various modifications, changes, alterations, and equivalent embodiments can be made by those skilled in the art without departing from the spirit and scope of the present invention.

The invention claimed is:

1. A thermoplastic resin composition comprising:
   about 100 parts by weight of a polycarbonate resin;
   about 1 to about 20 parts by weight of a rubber-modified vinyl copolymer resin;
   about 10 to about 30 parts by weight of a phosphorus flame retardant;
   about 3 to about 12 parts by weight of calcium carbonate;
   about 10 to about 40 parts by weight of talc;
   about 5 to about 11 parts by weight of wollastonite; and
   about 0.01 to about 5 parts by weight of a black pigment,
   wherein a weight ratio of calcium carbonate to talc ranges from about 1:1.5 to about 1:3.5 and a weight ratio of talc to wollastonite ranges from about 1:0.3 to about 1:0.7.

2. The thermoplastic resin composition according to claim 1, wherein the rubber-modified vinyl copolymer resin comprises about 60 wt % or more of a rubber-modified aromatic vinyl graft copolymer obtained through graft copolymerization of an aromatic vinyl monomer and an alkyl (meth) acrylate monomer to a rubber polymer and about 40 wt % or less of an aromatic vinyl copolymer resin.

3. The thermoplastic resin composition according to claim 2, wherein the aromatic vinyl copolymer resin is a polymer of a monomer mixture comprising an aromatic vinyl monomer and a vinyl cyanide monomer.

4. The thermoplastic resin composition according to claim 1, wherein the phosphorus flame retardant comprises a phosphate compound, a phosphonate compound, a phosphinate compound, a phosphine oxide compound, and/or a phosphazene compound.

5. The thermoplastic resin composition according to claim 1, wherein the rubber-modified vinyl copolymer resin is present in a smaller amount than the phosphorus flame retardant.

6. The thermoplastic resin composition according to claim 1, wherein the thermoplastic resin composition has a melt flow index (MI) of about 32 g/10 min to about 45 g/10 min, as measured at 220° C. under a load of 5 kgf in accordance with ASTM D1238, and a notched Izod impact strength of about 5 kgf cm/cm or more, as measured on a ⅛" thick specimen in accordance with ASTM D256.

7. The thermoplastic resin composition according to claim 1, wherein the thermoplastic resin composition has a glass transition temperature of about 82° C. to about 90° C. and a flame retardancy of V1 or higher, as measured on a 1.0 mm thick specimen in accordance with UL94 standard.

8. The thermoplastic resin composition according to claim 1, wherein the thermoplastic resin composition has a coefficient of linear expansion of about 20 cm/cm° C. to about 45 cm/cm° C., as measured on a 6.4 mm thick flexural specimen at 90° C. in accordance with ASTM D696.

9. The thermoplastic resin composition according to claim 1, wherein the thermoplastic resin composition has a gloss (60°) of about 95% to about 100%, as measured on an injection molded specimen at an angle of 60° in accordance with ASTM D523, and a luminance (L*) of about 90 to about 100, an a* value of about −0.1 to about 0.3 and a b* value of about −0.1 to about 0.3, as measured on a 3.2 mm thick specimen in accordance with ASTM D2244.

10. A molded product formed from the thermoplastic resin composition according to claim 1.

11. The molded product according to claim 10, wherein the molded product is a plastic member of a housing of an electronic product, the housing comprising a metal frame and the plastic member adjoining at least one surface of the metal frame.

\* \* \* \* \*